(12) United States Patent
Saha et al.

(10) Patent No.: US 10,761,961 B2
(45) Date of Patent: Sep. 1, 2020

(54) IDENTIFICATION OF SOFTWARE PROGRAM FAULT LOCATIONS

(71) Applicant: FUJITSU LIMITED, Kawasaki-shi, Kanagawa (JP)

(72) Inventors: Ripon K. Saha, Santa Clara, CA (US); Mukul R. Prasad, San Jose, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/231,079

(22) Filed: Dec. 21, 2018

(65) Prior Publication Data

US 2020/0201741 A1 Jun. 25, 2020

(51) Int. Cl.
*G06F 11/36* (2006.01)
*G06F 8/30* (2018.01)

(52) U.S. Cl.
CPC ............. *G06F 11/362* (2013.01); *G06F 8/30* (2013.01); *G06F 11/3688* (2013.01)

(58) Field of Classification Search
None
See application file for complete search history.

(56) References Cited

U.S. PATENT DOCUMENTS

| 8,127,275 | B1 * | 2/2012 | Hampapuram | ..... G06F 11/3672 714/38.1 |
| 8,719,791 | B1 * | 5/2014 | MacPherson | ......... G06F 9/4486 717/124 |
| 2005/0114839 | A1 * | 5/2005 | Blumenthal | ........ G06F 11/3672 717/124 |
| 2008/0189686 | A1 * | 8/2008 | Rajan | ................... G06F 11/3608 717/125 |
| 2011/0035726 | A1 * | 2/2011 | Davies | ....................... G06F 8/71 717/110 |
| 2011/0107307 | A1 * | 5/2011 | Liu | ....................... G06F 11/3664 717/125 |
| 2016/0246703 | A1 * | 8/2016 | Bank | ................... G06F 11/3664 |
| 2016/0306627 | A1 * | 10/2016 | Hewitt | ...................... G06F 8/33 |
| 2017/0046252 | A1 * | 2/2017 | Matsubara | .......... G06F 11/3684 |
| 2017/0242782 | A1 * | 8/2017 | Yoshida | .............. G06F 11/3692 |
| 2018/0165182 | A1 * | 6/2018 | Yoshida | .............. G06F 11/3688 |
| 2019/0018753 | A1 * | 1/2019 | Saha | .................. G06F 11/3624 |

(Continued)

OTHER PUBLICATIONS

Hovemeyer, David, and William Pugh. "Finding bugs is easy." Acm sigplan notices 39.12 (2004): 92-106.

(Continued)

*Primary Examiner* — Philip Wang
(74) *Attorney, Agent, or Firm* — Maschoff Brennan

(57) ABSTRACT

A method may include obtaining multiple lines of programming code of a program, and obtaining multiple test cases for testing the program, where each of the test cases includes an assertion upon which a result of a respective test case is based. The method may also include executing the program for each of the test cases, and identifying affected lines of programming code that influence the assertions. The method may additionally include calculating a risk score for at least one of the lines of programming code based on the affected lines of programming code and the assertion, the risk score indicative of a likelihood that the at least one of the lines of programming code includes a fault.

20 Claims, 5 Drawing Sheets

(56) References Cited

U.S. PATENT DOCUMENTS

2019/0042398 A1\* 2/2019 Prasad ................ G06F 11/3688
2019/0163619 A1\* 5/2019 Yoshida .............. G06F 11/0706

OTHER PUBLICATIONS

Jones, James A., and Mary Jean Harrold. "Empirical evaluation of the tarantula automatic fault-localization technique." Proceedings of the 20th IEEE/ACM international Conference on Automated software engineering. ACM, 2005.

Alves, Elton, et al. "Fault-localization using dynamic slicing and change impact analysis." Automated Software Engineering (ASE), 2011 26th IEEE/ACM International Conference on. IEEE, 2011.

Zhou, Jian, Hongyu Zhang, and David Lo. "Where should the bugs be fixed? more accurate information retrieval-based bug localization based on bug reports." Software Engineering (ICSE), 2012 34th International Conference on. IEEE, 2012.

Saha, Ripon K., et al. "Improving bug localization using structured information retrieval." Automated Software Engineering (ASE), 2013 IEEE/ACM 28th International Conference on. IEEE, 2013.

Wen, Ming, Rongxin Wu, and Shing-Chi Cheung. "Locus: Locating bugs from software changes." Automated Software Engineering (ASE), 2016 31st IEEE/ACM International Conference on. IEEE, 2016.

Le, Tien-Duy B., Richard J. Oentaryo, and David Lo. "Information retrieval and spectrum based bug localization: better together." Proceedings of the 2015 10th Joint Meeting on Foundations of Software Engineering. ACM, 2015.

\* cited by examiner

IDENTIFICATION OF SOFTWARE PROGRAM FAULT LOCATIONS

FIELD

The embodiments discussed in the present disclosure are related to identification of software program fault locations.

BACKGROUND

Software programs often have faults in them (commonly referred to as "bugs") in which they may not operate as intended. Often automated repair systems are used in an attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining multiple lines of programming code of a program, and obtaining multiple test cases for testing the program, where each of the test cases includes an assertion upon which a result of a respective test case is based. The method may also include executing the program for each of the test cases, and identifying affected lines of programming code that influence the assertions. The method may additionally include calculating a risk score for at least one of the lines of programming code based on the affected lines of programming code and the assertion, the risk score indicative of a likelihood that the at least one of the lines of programming code includes a fault.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure may relate to identifying the location of faults in a software program. In particular, rather than being based on whether or not a test case is passed or failed, the present disclosure may consider a number of factors in generating a risk score for lines of code in a program being analyzed, where the risk score represents the likelihood that the particular line of code includes a fault. For example, in determining the risk score, the present disclosure contemplates considering whether or not a line of code affects an assertion of a given test case (e.g., whether the line of code utilizes variables or functions that are used in the statement of the test case that determines whether the test case passes or fails). Additionally or alternatively, to determine the risk score, the present disclosure contemplates consideration of what lines of code affect the assertions of both passing and failing test cases, as well as the number of passing and failing test cases for which the line of code does not affect the test case.

The embodiments of the present disclosure provide an improvement to the technological field of software fault detection. In particular, the present disclosure contemplates a more detailed and more granular level of analysis of what factors may or may not be affecting a test case when being executed. For example, rather than merely looking at whether or not a test case is failed, or only looking at what lines of code are executed by a failing test case, the present disclosure looks at the lines of code that actually affect the assertion of the test case (e.g., the statement within the test case that determines whether it is passed or failed). By using the increased level of granularity, a more precise risk score may be provided of whether or not a line of code is likely to include a fault.

Furthermore, such teachings not only improve that technological field, but the result is an increase in computer efficiency and the preservation of computing resources. For example, for an automated computer program correcting system, the automated system may adjust lines of programming code and/or analyze all lines of code with a risk score above a threshold. However, by using the improved approaches described in the present disclosure, fewer false positives (e.g., lines of code thought to include a fault when no such fault exists) are produced such that fewer lines of code must be analyzed or replaced by such an automated system. Thus, the present disclosure improves the functioning of such a computer by preserving the computing resources expended for false positives or determining which of a large number of indistinguishable lines of code actually include a fault.

Embodiments of the present disclosure are explained with reference to the accompanying drawings.

Figure 1:
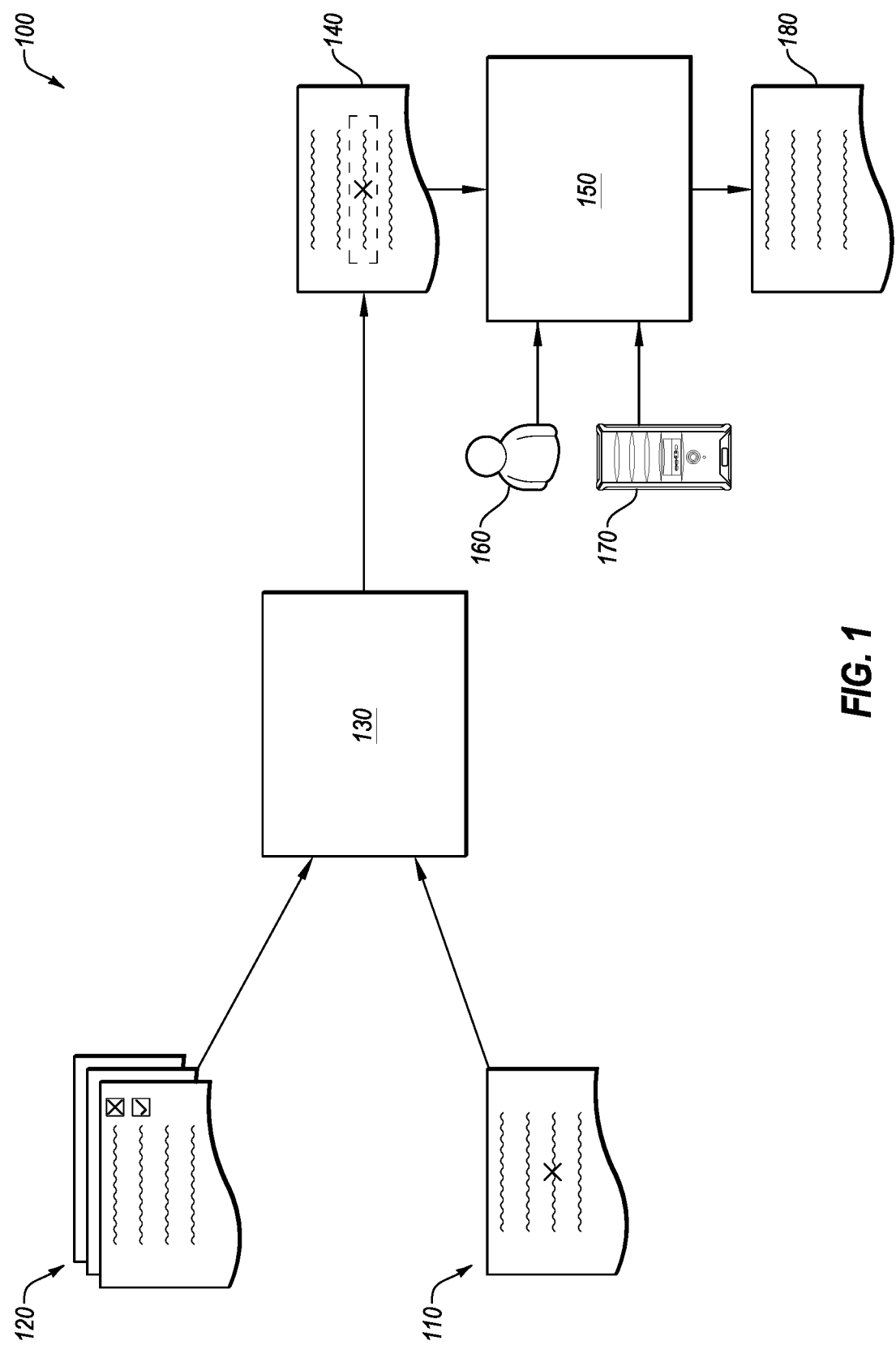
FIG. 1 is a diagram representing an example environment related to locating faults in a software program.

FIG. 1 is a diagram representing an example environment 100 related to locating faults in a software program, in accordance with one or more embodiments of the present disclosure. The environment 100 may include a fault locator 130 and a fault corrector 150. In operation, the fault locator 130 may obtain a program 110 and test cases 120. The fault locator may perform processing to provide an output 140 that identifies the location of faults within the program 110. The output 140 may be provided to the fault corrector 150 to generate a modified program 180. In some embodiments, the fault corrector 150 may be configured to operate based on input from a user 160, or may automatically generate the modified program 180 based on commands from a computing device 170, such as an artificial intelligence (AI) program.

The program 110 may include any computer-readable instructions that may cause a computing device to perform a set of operations. The program 110 may include human readable code or machine readable code. In some embodiments, the program 110 may include instructions in a computer programming language, such as C++, Java, Python, PHP, Perl, etc. When the computer program 110 is written by a human user, the computer program 110 may or may not include faults that cause the program 110 to operate incorrectly. In some embodiments, the program 110 may include code of the program, libraries, applications, scripts, or other logic or instructions for execution by a processing device. In some embodiments, the program 110 may include multiple lines of code in which each line of code may be referenced independently. In some embodiments, the program 110 may include less than a complete instance of a software program such that only a portion of a more complete program may be analyzed.

While the present disclosure refers to lines of programming code, any other slicing or designation of the program 110 is contemplated. For example, the program 110 may be sliced into statements that are distinct or separate from lines of code, such that a given statement may cover multiple lines of code and/or only be a portion of a line of code. In some embodiments, such slicing may be done in a static fashion, such that statements are identified based on control flow and/or data flow analyses. Additionally or alternatively, the slicing of the program may be performed in a dynamic fashion, such that the statements are identified based on the data dependency from execution of the program 110 for a given input. Thus, while referred to as lines of code, any such portion or slice of the program 110 is contemplated as being analyzed to determine whether such a portion includes a fault.

Each of the test cases 120 may include one or more assertions that provide insight into whether or not the program 110 operates correctly. For example, each test case may include an assertion (e.g., a statement with a true or false result based on operation of the program using the test case) that dictates whether or not the test case is passed or failed. A passed test case may indicate that the program 110 operated correctly or otherwise operated as expected, and a failed text case may indicate that the program 110 includes one or more faults. In some embodiments, the test cases 120 may include one or more inputs to the program 110. For example, a given test case may include a known input and may have an expected result, and if the expected result is returned, the given test case may be passed, while if an unexpected result is returned, the given test case may be failed. As another example, an unknown input or a series of random inputs may be utilized as one or more of the test cases 120 to observe how the program 110 responds to varied inputs. If the program 110 is able to successfully execute and run to completion with each of the varied or random inputs, the associated test case may be passed and if the program 110 crashes during any of the executions, the associated test case may be failed.

For a given test case with a single assertion, the passing or failing of the assertion may correspond directly with passing or failing the given test case as it is the sole assertion to address passing or failing the given test case. In such a circumstance, a passing assertion may also be referred to as passing the given test case. For another given test case with multiple assertions, the other given test case would pass if all of the assertions passed, and a single failing assertion would cause the other given test case to fail. In some embodiments, for test cases with multiple assertions, the test case may be separated into multiple test cases, each with a single assertion.

The fault locator 130 may include a process, set of programming instructions, hardware, software, or any combinations thereof configured to facilitate the identification of faults within the program 110 based on the test cases 120. In some embodiments, the fault locator 130 may be configured to determine a probability that a given line of code within the program 110 has a fault. The fault locator 130 may be configured to operate on all the lines of the program 110, or a subset thereof.

In some embodiments, the fault locator 130 may be configured to track which lines of code are executed during the execution of a test case. For example, a trace or other feature for tracking may be interspersed in the program 110 such that during execution of the test case 120, the fault locator 130 may determine which lines of code were executed during operation of the program 110 to verify the test case. In some embodiments, such a trace may include an instruction or other instrument that causes a line number to be printed for any executed line such that after execution, the line numbers of code, their order, etc. may be observed after execution of the program 110.

In some embodiments, the fault locator 130 may be configured to identify which lines of code affect or otherwise influence the outcome of the test cases 120. For example, for a given test case, the test case may include an assertion that results in either the passing or failing of the test case. The fault locator 130 may be configured to identify which lines of code in the program 110 actually influence the assertion of the given test case. For example, when being executed to verify a given test case, ten lines of code may be executed to verify the given test case but only two of those ten lines would actually affect the determination one way or the other relative to the given test case, and those two lines may be designated as the lines of code affecting the given test case.

To facilitate identification of the affected lines of code, in some embodiments the fault locator may identify functions or variables in the given test case that influence the assertion, and the lines of programming code may be parsed to identify where those functions or variables are used in the lines of program code that are executed during execution based on the given test case. Additionally or alternatively, a given test case may be parsed to identify the assertion within the given test case, and the assertion may be analyzed to determine the variables and/or functions that influence and/or dictate the outcome of the given test case. Following the identification of the variables and/or functions that influence and/or dictate the outcome of the given test case, the program 110 may be analyzed to find lines of code within the program 110 that use the variables and/or functions. In these and other embodiments, each of the affected lines of code may be tracked to determine whether the test case affected by the line of code passed or failed.

In some embodiments, the fault locator 130 may be configured to determine a risk score for one or more lines of code within the program 110, including potentially determining a risk score for each line of code within the program 110. In these and other embodiments, the risk score for a given line of code may be based on a number of factors, including one or more of the number of assertions that fail and are affected by the line of code ($a_f$), the number of assertions that fail and are not affected by the line of code ($n_f$), the number of assertions that pass and are affected by the line of code ($a_p$), and the number of assertions that pass and are not affected by the line of code ($n_p$). Various examples of determining the risk score may be described with reference to FIG. 4.

In some embodiments, the fault locator 130 may use the risk scores to identify fault locations within the program 110. For example, the fault locator 130 may identify lines of code with risk scores above a threshold as being locations of faults within the program 110. In some embodiments, the fault locator 130 may generate the output 140 as a sorted list of lines of program code of the program 110 that are sorted based on risk scores.

The output 140 may include any information or collection of data that indicates locations of faults within the program 110 as output by the fault locator 130. In some embodiments, the output 140 may be a copy of the program 110 with one or more lines of code designated as including a fault. Additionally or alternatively, the output 140 may include a listing of each of the lines of code sorted by risk score such that the lines of code most likely to include a fault are listed at the top of the set of lines of code. The output 140 may additionally or alternatively include the numerical values calculated for the risk scores.

The fault corrector 150 may include a process, set of programming instructions, hardware, software, or any combinations thereof configured to facilitate the correction of faults identified in the output 140. The fault corrector 150 may be configured to operate on all the identified faults of the output 140, or a subset thereof. For example, the fault corrector 150 may operate to correct or otherwise replace lines of code with an associated risk score above a threshold.

The fault corrector 150 may be configured to perform a series of repair operations with respect to the program 110 that may be used to repair or correct one or more faults in the program 110. In some embodiments, the fault corrector 150 may be configured to perform one or more of the repair operations with respect to one or more fault locations included in the output 140. The repair operations may include any change to a particular line of code that may repair a fault that may be included in the particular line of code. In some embodiments, the changes may be made based on input from the user 160 or based on input from the computing device 170. In some embodiments, the fault corrector 150 may be configured to output the modified program 180, which may include one or more modified lines of code with respect to one or more fault locations as identified in the output 140.

In some embodiments, the human operator 160 may be presented with the output 140 and may utilize the fault corrector 150 to replace or modify one or more lines of the program 110 manually to address the faults located within the output 140. For example, the human operator 160 may manually retype certain lines of code, may be presented with suggested lines of code or suggested edits to certain lines of code, etc.

In some embodiments, the computing device 170 may operate via the fault corrector 150 to automatically generate the modified program 180. For example, the computing device 170 may utilize an artificial intelligence system that analyzes banks of example lines of programming code found to be operable and may replace a line of code identified in the output 140 as including a fault with a modified line of code as identified by the artificial intelligence system of the computing device 170. In these and other embodiments, the computing device 170 may consider any of a variety of factors to determine a line of code to be used as a replacement line of code, including author of the program 110, surrounding lines of code to the line of code including the fault, variables and functions called in the line of code including the fault, libraries called by the program 110, etc.

Modifications, additions, or omissions may be made to FIG. 1 without departing from the scope of the present disclosure. For example, the environment 100 may include more or fewer elements than those illustrated and described in the present disclosure. For example, in some embodiments, one or more routines, one or more instructions, or at least a portion of code implementing the test cases 120, the fault locator 130, the fault corrector 150, and/or the computing device 170 may be combined or separated. In some embodiments operations may be performed in a different order from what is described above.

Moreover, in some embodiments, the output 140 may be used outside of the environment 100. In these or other embodiments, the environment 100 may include the fault locator 130 but not the fault corrector 150.

Figure 2:
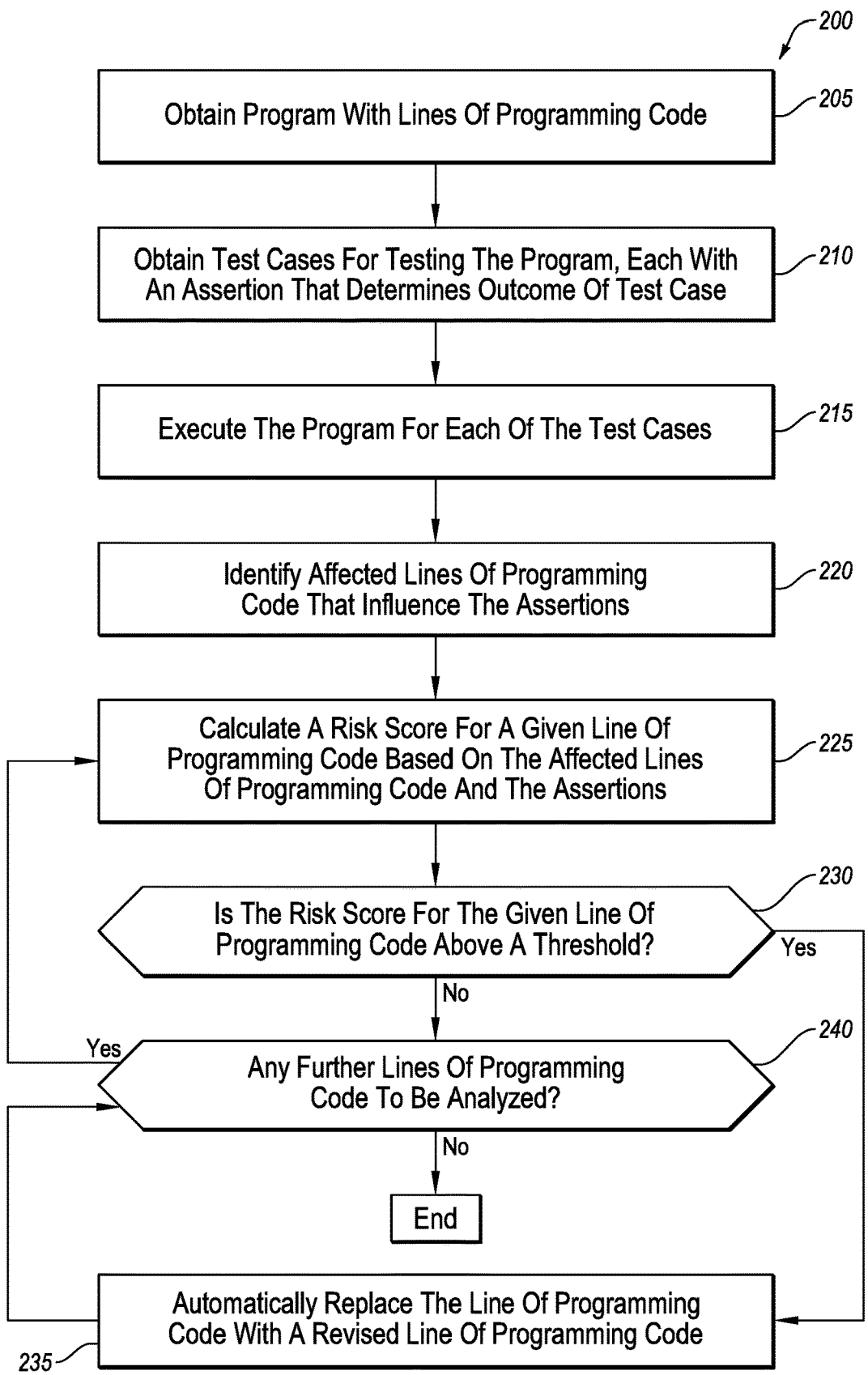
FIG. 2 illustrates a flowchart of an example method of identifying a fault location in a software program.

FIG. 2 illustrates a flowchart of an example method 200 of identifying a fault location in a software program, in accordance with one or more embodiments of the present disclosure. The method 200 may be performed by any suitable system, apparatus, or device with respect to code under test. For example, the fault locator 130 and/or the fault corrector 150 of FIG. 1, or the computing system 500 of FIG. 5 (e.g., as directed by a fault locator) may perform or direct performance of one or more of the operations associated with the method 200 with respect to the software program. Although illustrated with discrete blocks, the steps and operations associated with one or more of the blocks of the method 200 may be divided into additional blocks, combined into fewer blocks, or eliminated, depending on the particular implementation.

At block 205, a program with lines of programming code may be obtained. For example, a fault locator (e.g., the fault locator 130 of FIG. 1) may be provided a program (e.g., the program 110 of FIG. 1) to identify faults for the program. In some embodiments, obtaining the program may include a user uploading the program to a remote computing device, submitting the program to a separate analysis program (e.g., the fault locator), or any other approach by which the fault locator may obtain the program to be analyzed for faults.

At block 210, test cases may be obtained for testing the program, where each of the test cases may include an assertion that determine the outcome of the respective test case. For example, the fault locator may pull one or more test cases from a database of test cases. As another example, the user may provide one or more test cases to be used to identify faults in the program. As an additional example, the user may designate one or more features of the program which the user wants checked for faults, and one or more test cases may be generated based on the selected features and/or the lines of programming code of the program.

At block 215, the program may be executed for each of the test cases. For example, the fault locator may execute the program to determine whether or not the program passes or fails each of the test cases. In these and other embodiments, the fault locator may trace or track the execution of the program to identify which lines of code were executed during the testing of certain test cases.

At block 220, the affected lines of programming code may be identified. For example, the fault locator may identify which of the lines of programming code influence the assertions. As described above, the affected lines of code may be identified based on the variables and/or functions in the lines of programming code that influence the outcome of the testing case. One example of the operations associated with the block 220 may be illustrated with respect to FIG. 3.

At block 225, a risk score for a given line of programming code may be calculated based on the affected lines of programming code and the assertions. For example, the fault locator may be configured to calculate a risk score for a given line of code based on whether or not the given line of programming code affected one or more of the assertions of the test cases and whether or not those test cases passed or failed. Additionally or alternatively, the risk score may be based on a number of passed and/or failed test cases where the given line of programming code did not affect the assertion of a given test case. Examples of calculating the risk score may be described with reference to FIG. 4.

At block 230, a determination may be made whether the risk score of the block 225 for the given line of programming code is above a threshold. If the risk score is above a threshold, the method may proceed to the block 235. If the risk score is not above a threshold, the method may proceed to the block 240.

At block 235, the line of programming code with the risk score above the threshold may be automatically replaced with a revised line of programming code. For example, a fault corrector (such as the fault corrector 150 of FIG. 1) may identify a replacement line of programming code to replace the line of programming code with the risk score above the threshold, and may replace the line of programming code to generate a revised program.

At block 240, a determination may be made whether there are further lines of programming code to be analyzed to identify a risk score for the further lines of programming code. If there are further lines of code that have not had a risk score determined yet, the method may return to the block 225 to determine a risk score for a next line of code. If there are no further lines of code for which a risk score is to be determined, the method may end. By iteratively going through the blocks 225 through 240, each of the lines of programming code may have an associated risk score calculated.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, in some embodiments, the block 230 and/or 235 may be omitted and/or replaced with the generation of a list of lines of programming code with associated risk scores, whether sorted or not.

Figure 3:
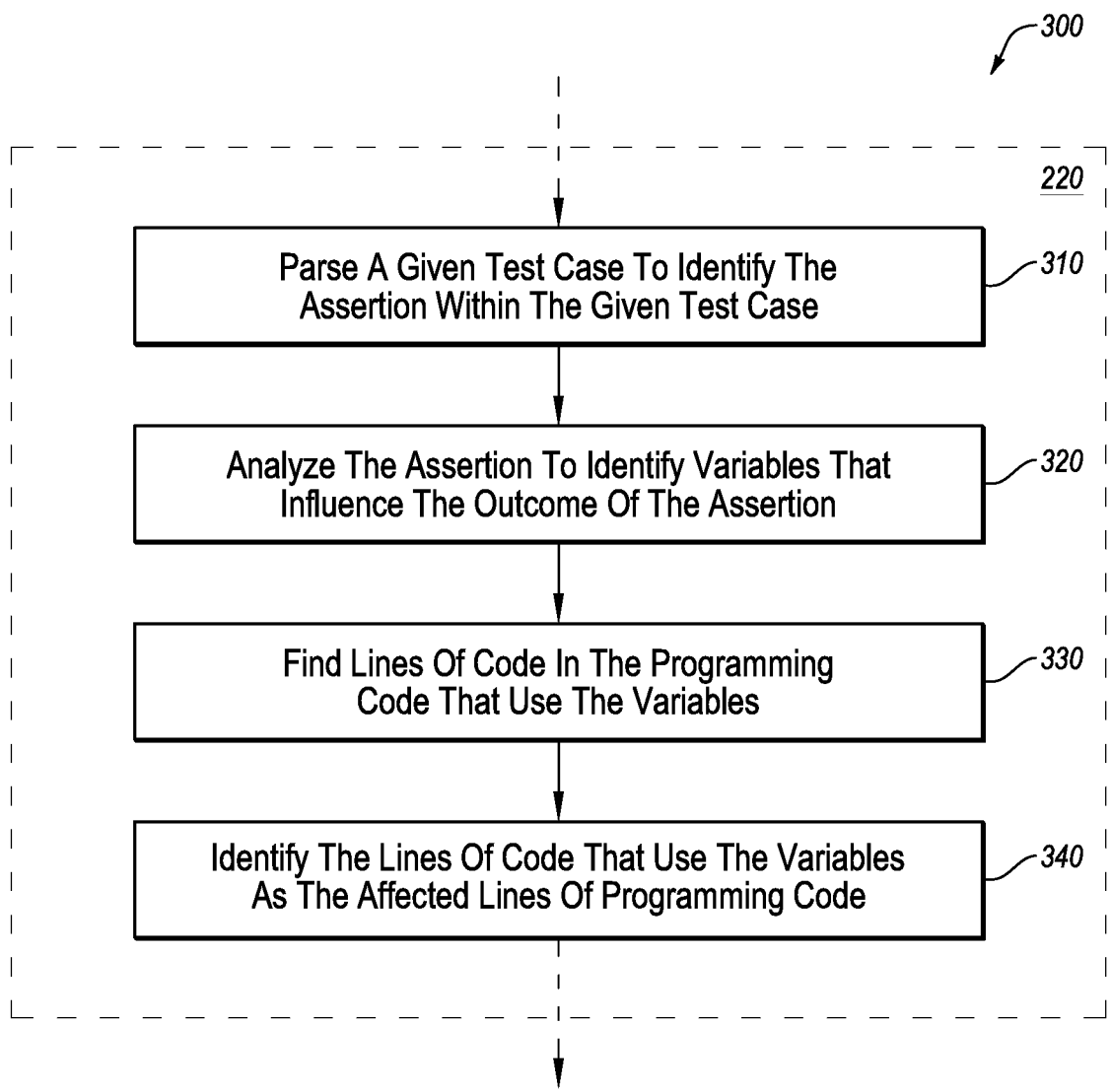
FIG. 3 illustrates a flowchart of an example method of identifying lines of programming code that influence assertions that inform the outcome of a given test case.

FIG. 3 illustrates a flowchart of an example method 300 of identifying lines of programming code that influence assertions that inform the outcome of a given test case, in accordance with one or more embodiments of the present disclosure. The method 300 may be performed by any suitable system, apparatus, or device with respect to code under test. For example, the fault locator 130 of FIG. 1, or the computing system 500 of FIG. 5 (e.g., as directed by a fault locator) may perform or direct performance of one or more of the operations associated with the method 300 with respect to the software program. Although illustrated with discrete blocks, the steps and operations associated with one or more of the blocks of the method 300 may be divided into additional blocks, combined into fewer blocks, or eliminated, depending on the particular implementation. The method 300 may represent an example set of operations associated with the block 220 of FIG. 2.

At block 310, a given test case may be parsed to identify the assertion within the given test case. For example, a fault locator (such as the fault locator 130 of FIG. 1) may be configured to parse the given test case to identify a statement within the test case that is determinative of whether the test case is passed or failed.

At block 320, the assertion may be analyzed to identify variables that influence the outcome of the assertion. Additionally or alternatively, functions, libraries, or other features or aspects of the assertion may be identified within the assertion that may dictate the outcome of the assertion.

At block 330, lines of programming code that use the identified variables may be found. Additionally, lines of programming code that call, determine, or otherwise influence the functions, libraries, or other features or aspects of the assertion may be found.

At block 340, the lines of programming code found at block 330 may be identified as the affected lines of programming code. For example, the lines of programming code found at block 330 may be the actual lines of code that dictate whether or not the test case associated with the assertion are passed or failed, as the test case depends on the assertion, and the assertion is determined by the lines of programming code that use the variables, functions, etc. of the assertion.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4:
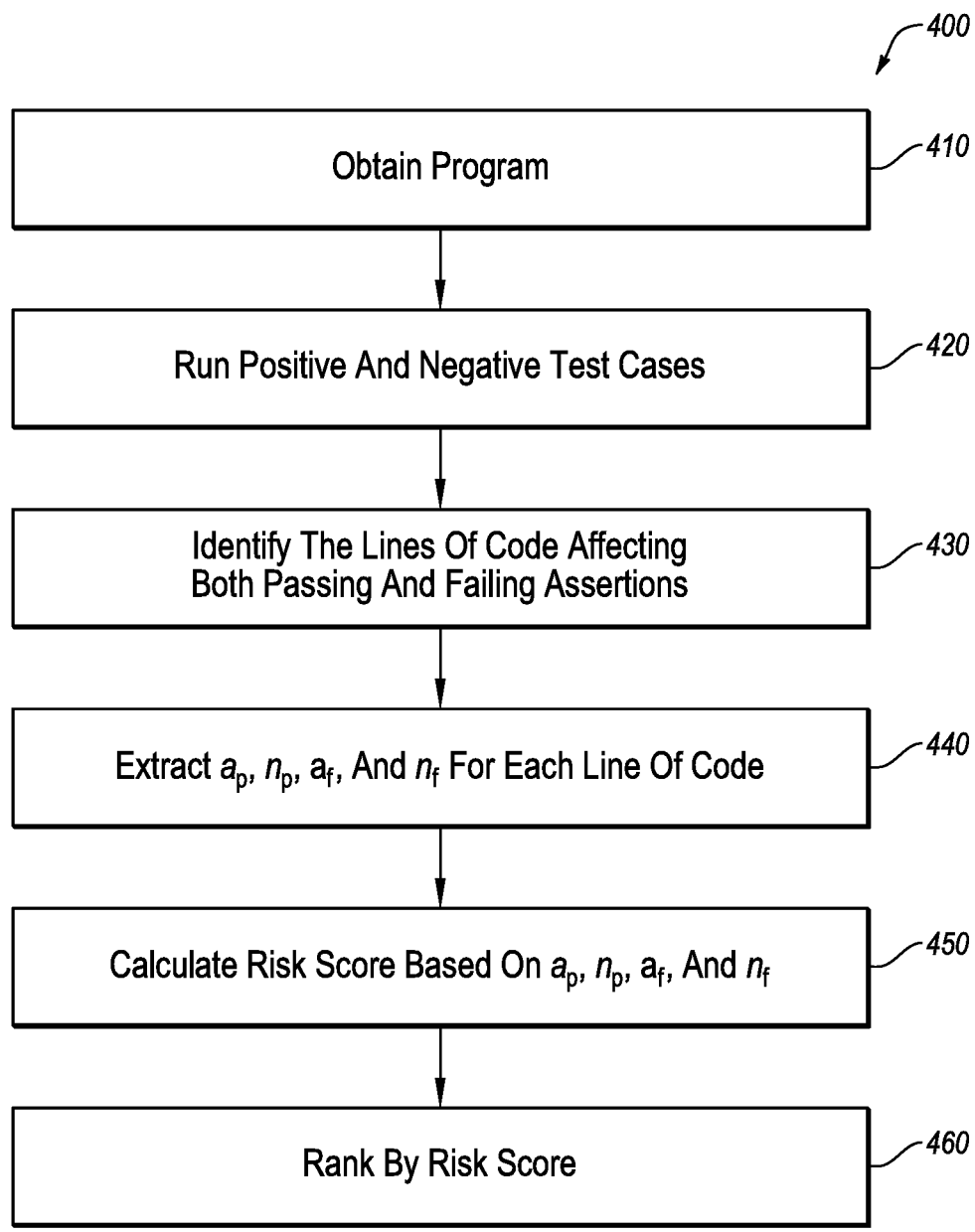
FIG. 4 illustrates a flowchart of an example method of determining a risk scores for lines of code of a software program.

FIG. 4 illustrates a flowchart of an example method of determining a risk scores for lines of code of a software program, in accordance with one or more embodiments of the present disclosure. The method 400 may be performed by any suitable system, apparatus, or device with respect to code under test. For example, the fault locator 130 of FIG. 1, or the computing system 500 of FIG. 5 (e.g., as directed by a fault locator) may perform or direct performance of one or more of the operations associated with the method 400 with respect to the software program. Although illustrated with discrete blocks, the steps and operations associated with one or more of the blocks of the method 400 may be divided into additional blocks, combined into fewer blocks, or eliminated, depending on the particular implementation.

At block 410, a program may be obtained. The block 410 may be similar or comparable to the block 205 of FIG. 2.

At block 420, both positive and negative test cases may be run on the program. For example, multiple test cases may be executed, some of which are passed and some of which are failed. In some embodiments, the program may tracked or traced during execution of the test cases such that lines of code that may be used or executed during the execution of the test cases may be identified.

At block 430, the lines of code affecting the assertions of the test cases may be identified, both for the passing and the failing assertions. For example, the lines of programming code may be parsed or searched to identify lines of code that include variables or functions located within the assertions for the test cases.

At block 440, the factors $a_p$, $n_p$, $a_f$, and $n_f$ may be extracted for each line of code. For example, the factor $a_p$ may indicate the number of assertions that pass and are affected by the line of code; the factor $n_p$ may indicate the number of assertions that pass and are not affected by the line of code, the factor $a_f$ may indicate the number of assertions that fail and are affected by the line of code; and $n_f$ may indicate the number of assertions that fail and are not affected by the line of code.

At block 412, a risk score may be determined for each line of code. In some embodiments, the risk score may be determined based on the use factors determined for the respective statement. For example, in some embodiments, the risk score for each line of code may be based on $a_p$, $n_p$, $a_f$, and $n_f$ of the respective line of code. Some functions for calculating a risk score may include:

$$\text{Tarantula function} = \frac{\frac{a_f}{a_f + n_f}}{\frac{a_f}{a_f + n_f} + \frac{a_p}{a_p + n_p}}$$

$$\text{Ochiai function} = \frac{a_f}{\sqrt{(a_f + n_f)(a_f + a_p)}}$$

In some embodiments, the risk scores may be normalized. For example, in some instances, the risk scores may be normalized to have a value between "0" and "1" in which a score of "1" indicates a very high likelihood of the respective line of code including a fault and in which a score of "0" indicates a very low or zero likelihood of the respective line of code including a fault. Below is an example expression for determining a normalized risk score for a particular line of code:

$$\text{Normalized Risk Score} = \frac{\text{Risk Score of the Line of Code}}{\text{Maximum Risk Score of Any Line of Code}}$$

In the above expression: "Risk Score of the Line of Code" may refer to the risk score determined for the particular line of code; and "Maximum Risk Score of Any Line of Code" may refer to the highest risk score that may be determined with respect to all of the lines of code of the program being analyzed. Note that for a line of code that has the highest risk score, the numerator and the denominator is the same. In some embodiments, the normalization may be performed after a risk score has been determined for every line of code.

At block 460, the lines of programming code may be ranked by risk score. For example, the lines of code may be sorted and displayed, stored, or otherwise organized based on the risk scores of the lines of programming code.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 5:
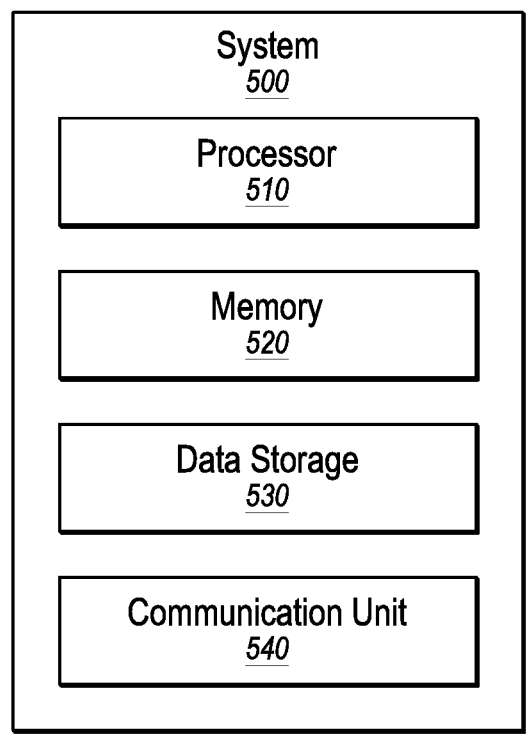
FIG. 5 illustrates an example computing system.

FIG. 5 illustrates an example computing system, according to at least one embodiment described in the present disclosure. The system 500 may include any suitable system, apparatus, or device configured to participate in the identification of the location of faults in a software program. The computing system 500 may include a processor 510, a memory 520, a data storage 530, and a communication unit 540, which all may be communicatively coupled. The data storage 530 may include various types of data, such as computer-readable instructions to perform operations to identify the location of lines of programming code with a high risk of including a fault.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 550 may execute the program instructions, such as instructions to perform the methods 200, 300, and/or 400 of FIGS. 2, 3, and 4, respectively. For example, the processor 510 may obtain instructions regarding running test cases for a program and determining which lines of code affect the assertions of the test cases, and whether the test cases are passed or failed.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   obtaining a plurality of lines of programming code of a program;
   obtaining a plurality of test cases for testing the program, each of the test cases including an assertion upon which a result of a respective test case is based;
   executing the program for each of the test cases;
   identifying affected lines of programming code that influence the assertions; and
   calculating a risk score for at least one of the plurality of lines of programming code based on the affected lines of programming code and the assertion, the risk score indicative of a likelihood of the at least one of the plurality of lines of programming code including a fault, the risk score calculated for a given line of code based at least on factors comprising:
      a first number of the assertions that pass and are affected by the given line of code;
      a second number of assertions that pass and are unaffected by the given line of code;
      a third number of the assertions that fail and are affected by the given line of code; and
      a fourth number of assertions that fail and are unaffected by the given line of code.

2. The method of claim 1, wherein calculating the risk score is further based on at least one test case that produced a positive result and at least one test case that produced a negative result.

3. The method of claim 1, wherein calculating the risk score is further based on at least one test case that produced a positive result.

4. The method of claim 1, wherein identifying affected lines of programming includes:
parsing a given test case to identify the assertion within the given test case;
analyzing the assertion to identify one or more variables that influence an outcome of the assertion;
finding lines of code within the plurality of lines of programming code that use the one or more variables; and
identifying the lines of code that use the one or more variables as the affected lines of programming code.

5. The method of claim 4, wherein finding the lines of code are based on at least one of control-flow analysis and data-flow analysis.

6. The method of claim 1, wherein identifying the affected lines of programming code is based on data dependency from execution of a program.

7. The method of claim 1, further comprising generating a display of the plurality of lines of programming code of the program and a corresponding risk score for each of the lines of programming code.

8. The method of claim 1, further comprising:
identifying a risky line of programming code of the program with a corresponding risk score above a threshold score; and
in response to the corresponding risk score being above a threshold, automatically replacing the risky line of programming code with a revised line of programming code.

9. A non-transitory computer-readable medium containing instructions which, in response to being executed by one or more processors, cause a system to perform operations, the operations comprising:
obtaining a plurality of lines of programming code of a program;
obtaining a plurality of test cases for testing the program, each of the test cases including an assertion upon which a result of a respective test case is based;
executing the program for each of the test cases;
identifying affected lines of programming code that influence the assertions; and
calculating a risk score for at least one of the plurality of lines of programming code based on the affected lines of programming code and the assertion, the risk score indicative of a likelihood of the at least one of the plurality of lines of programming code including a fault, the risk score calculated for a given line of code based at least on factors comprising:
a first number of the assertions that pass and are affected by the given line of code;
a second number of assertions that pass and are unaffected by the given line of code;
a third number of the assertions that fail and are affected by the given line of code; and
a fourth number of assertions that fail and are unaffected by the given line of code.

10. The computer-readable medium of claim 9, wherein calculating the risk score is further based on at least one test case that produced a positive result and at least one test case that produced a negative result.

11. The computer-readable medium of claim 9, wherein calculating the risk score is further based on at least one test case that produced a positive result.

12. The computer-readable medium of claim 9, wherein identifying affected lines of programming includes:
parsing a given test case to identify the assertion within the given test case;
analyzing the assertion to identify one or more variables that influence an outcome of the assertion;
finding lines of code within the plurality of lines of programming code that use the one or more variables; and
identifying the lines of code that use the one or more variables as the affected lines of programming code.

13. The computer-readable medium of claim 12, wherein finding the lines of code are based on at least one of control-flow analysis and data-flow analysis.

14. The computer-readable medium of claim 9, wherein identifying the affected lines of programming code is based on data dependency from execution of a program.

15. The computer-readable medium of claim 9, further comprising generating a display of the plurality of lines of programming code of the program and a corresponding risk score for each of the lines of programming code.

16. The computer-readable medium of claim 9, further comprising:
identifying a risky line of programming code of the program with a corresponding risk score above a threshold score; and
in response to the corresponding risk score being above a threshold, automatically replacing the risky line of programming code with a revised line of programming code.

17. A system comprising:
one or more processors;
one or more non-transitory computer-readable media containing instructions which, when executed by the one or more processors, causes the system to perform operations, the operations comprising:
obtaining a plurality of lines of programming code of a program;
obtaining a plurality of test cases for testing the program, each of the test cases including an assertion upon which a result of a respective test case is based;
executing the program for each of the test cases;
identifying affected lines of programming code that influence the assertions; and
calculating a risk score for at least one of the plurality of lines of programming code based on the affected lines of programming code and the assertion, the risk score indicative of a likelihood of the at least one of the plurality of lines of programming code including a fault, the risk score calculated for a given line of code based at least on factors comprising:
a first number of the assertions that pass and are affected by the given line of code;
a second number of assertions that pass and are unaffected by the given line of code;
a third number of the assertions that fail and are affected by the given line of code; and
a fourth number of assertions that fail and are unaffected by the given line of code.

18. The system of claim 17, wherein calculating the risk score is further based on at least one test case that produced a positive result and at least one test case that produced a negative result.

19. The system of claim 17, wherein identifying affected lines of programming includes:
parsing a given test case to identify the assertion within the given test case;
analyzing the assertion to identify one or more variables that influence an outcome of the assertion;

finding lines of code within the plurality of lines of programming code that use the one or more variables; and identifying the lines of code that use the one or more variables as the affected lines of programming code.

20. The system of claim 17, further comprising:

identifying a risky line of programming code of the program with a corresponding risk score above a threshold score; and in response to the corresponding risk score being above a threshold, automatically replacing the risky line of programming code with a revised line of programming code.

* * * * *